(12) United States Patent
Tomczyk

(10) Patent No.: US 6,318,335 B2
(45) Date of Patent: Nov. 20, 2001

(54) OPERATING METHOD OF AN INTERNAL COMBUSTION ENGINE AND CORRESPONDING INTERNAL COMBUSTION ENGINE

(75) Inventor: Hubert Tomczyk, Duesseldorf (DE)

(73) Assignee: diro GmbH & Co. KG, Ruehen-Brechtorf (DE)

( * ) Notice: Subject to any disclaimer, the term of this patent is extended or adjusted under 35 U.S.C. 154(b) by 0 days.

(21) Appl. No.: 09/815,230

(22) Filed: Mar. 22, 2001

Related U.S. Application Data

(63) Continuation of application No. PCT/DE99/02945, filed on Sep. 16, 1999.

(51) Int. Cl.$^7$ .................................................... F02B 19/02
(52) U.S. Cl. ..................... 123/256; 123/292; 123/80 DA
(58) Field of Search ................................. 123/255, 256, 123/258, 264, 275, 292, 80 BA, 80 D, 80 DA, 190.14, 190.15

(56) References Cited

U.S. PATENT DOCUMENTS

| | | | |
|---|---|---|---|
| 2,394,767 | * | 2/1946 | Hall ................................ 123/80 DA |
| 3,526,215 | * | 9/1970 | Aspin et al. ..................... 123/80 DA |
| 3,730,161 | | 5/1973 | Deane ............................. 123/190.14 |
| 3,911,878 | | 10/1975 | Hofbauer et al. .................. 123/80 R |
| 5,000,136 | * | 3/1991 | Hansen et al. .................. 123/80 DA |
| 5,074,265 | | 12/1991 | Ristin et al. ......................... 123/292 |
| 5,115,775 | * | 5/1992 | Gruenwald ........................... 123/256 |
| 5,237,964 | * | 8/1993 | Tomoiu ............................... 123/256 |

FOREIGN PATENT DOCUMENTS 0 074 174 A1   3/1983 (EP) .

* cited by examiner

Primary Examiner—Willis R. Wolfe
(74) Attorney, Agent, or Firm—Husch & Eppenberger, LLC; Robert E. Muir; Kevin M. Kercher

(57) ABSTRACT

The invention relates to an operating method of an internal combustion engine. According to the method, a fuel-air mixture is rapidly combusted in order to move a piston. The fuel contained in or introduced into an occluded fresh gas is evaporated in the fresh gas, which has already been sucked into a cylinder chamber and then compressed. The fuel is then combusted and the piston is subjected to the pressure produced by the combustion gases (working cycle). After performing its working cycle, the piston ejects the waste gases from the cylinder chamber. The aim of the invention is to improve the efficiency of the internal combustion engine. To this end, the fresh gas that is compressed during the compression cycle is pressed into a first combustion chamber. The aforementioned evaporation process is then carried out in the first combustion chamber once it has been sealed off from the cylinder chamber. The aforementioned combustion process then begins, and at the same time, a second combustion chamber, which is sealed all around prior to this stage, opens to the cylinder chamber and the piston is subjected to the action of the combustion gases which have been produced as before and which expand out of the second combustion chamber, so that it can perform its working cycle. As a result, in each compression cycle, one of the two combustion chambers is filled alternately and for each subsequent working cycle, the piston is impinged upon from the other of the two combustion chambers.

17 Claims, 5 Drawing Sheets

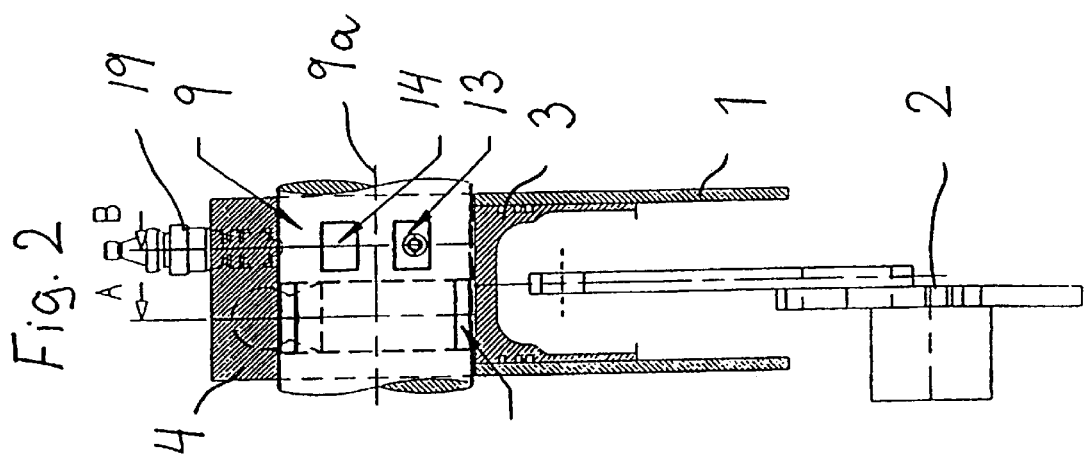
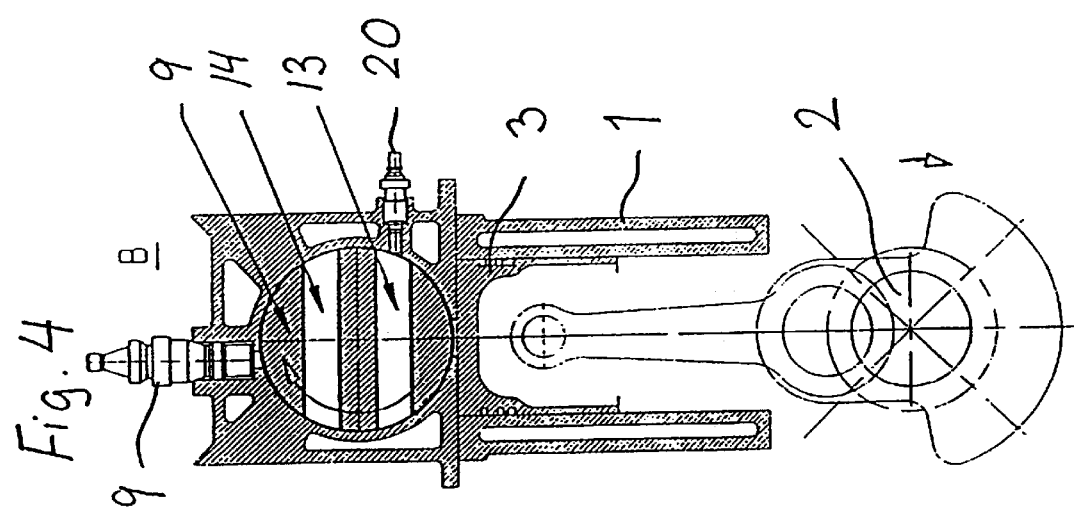
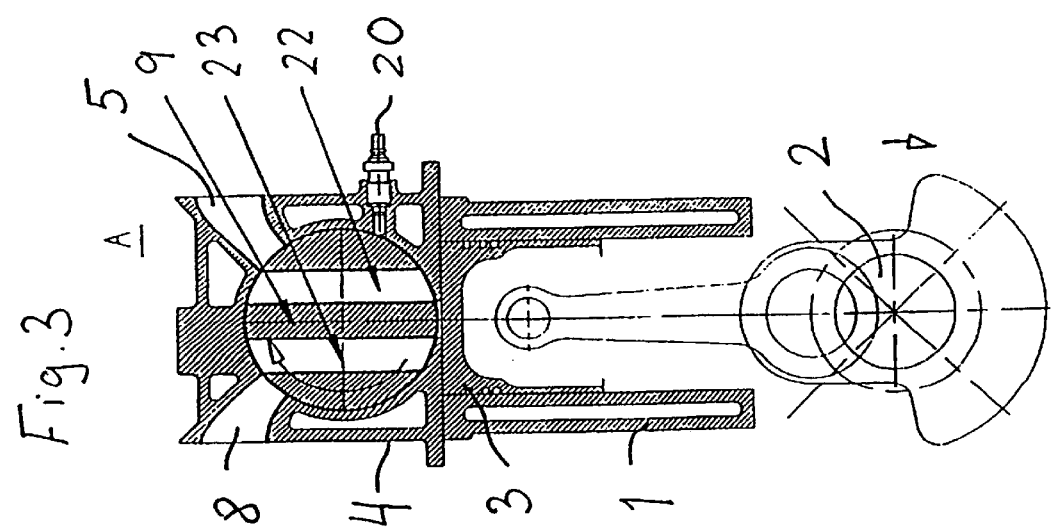

OPERATING METHOD OF AN INTERNAL COMBUSTION ENGINE AND CORRESPONDING INTERNAL COMBUSTION ENGINE

APPLICATION CROSS-REFERENCE

This application is a continuation of PCT Application No. PCT/DE99/02945, filed Sep. 16, 1999 and which named the United States as a designated country.

BACKGROUND OF THE INVENTION

This present invention involves a method of operation of an internal combustion engine. An internal combustion engine includes a piston that is moved by rapid combustion of a fuel/air mixture, wherein fresh gas is first drawn into a cylinder chamber and then compressed, vaporization of the fuel contained in or introduced into the enclosed fresh gas is carried out, then combustion thereof is commenced and with the pressure of the combustion gases generated thereby the piston is acted upon (power stroke), which after performance of the piston's power stroke expels the exhaust gases from the cylinder chamber.

With known internal combustion engines the combustion chambers (e.g. of the Ricardo, Perkins, Hercules, Deutz, ACO etc. type) are arranged stationarily in the cylinder head, engine block and/or in the engine piston. In EP-A-1-0 074 174 is disclosed a theoretical proposal which provides a rotating preliminary combustion chamber in which a portion of a rich mixture is to be burnt, which is then intended to serve as an igniter of a leaner mixture in the ordinary combustion chamber.

A common feature of all embodiments is the design-related and process-related brief time for vaporization of the fuel and for combustion thereof It is also a drawback that combustion cannot be carried out under a volume which is kept constant, but takes place in a stroke volume between approx. −15° before to +35° after top dead center. This results in incomplete fuel combustion and noxious exhaust gases. In the case of fuels, which require more time for their mixture preparation (diesel), or for their combustion (alcohol), there is in addition a restriction on the maximum possible speed. The available combustion time is within an order of magnitude of about 0.001 s. Forced compromises such as, e.g., an increase in the excess air or tolerance of incomplete combustion lead to a drop in efficiency as well as an increase in emission of pollutants. With the known methods of operation a decrease in the excess air would lead to incomplete combustion, to further energy losses as well as to increased discharge of pollutants. Increasing the theoretical efficiency by lowering the exhaust temperature is possible only with increased expenditure on apparatus.

To lengthen the mixture preparation and combustion time, the fuel is already mixed with air in the carburetor or, in the case of indirect fuel injection, in the inlet port, with the result however that the problems can be reduced only to a limited extent.

The present invention is directed to overcoming one or more of the problems set forth above.

SUMMARY OF THE INVENTION

It is an aspect of the present invention for an internal combustion engine with at least one piston that is driven by a crankshaft and guided in a cylinder whose cylinder chamber located above the piston can be alternately connected by a valve control system to an inlet pipe for fresh gas and to an exhaust pipe for the exhaust gases and is connected to a combustion chamber in which vaporization of the fuel contained in or introduced into the compressed fresh gas and then combustion thereof are effected.

Another aspect of the invention to improve the method of operation described hereinbefore particularly with respect to its efficiency and to develop a suitable internal combustion engine for carrying out this method of operation.

Starting from the method described hereinbefore, this aspect is achieved according to the invention by the fact that in a compression stroke the fresh gas which is compressed in the process is forced into a first combustion chamber in which, after it is closed off from the cylinder chamber, the vaporization is carried out and the combustion is commenced, while at the same time a second combustion chamber previously closed on all sides is opened to the cylinder chamber and the piston for carrying out a power stroke is subjected to combustion gases expanding from this second combustion chamber and previously generated in the same way, so that at each compression stroke alternately one of the two combustion chambers is filled and for each subsequent power stroke the piston is displaced from the other of the two combustion chambers.

In this case it is appropriate if both combustion chambers are kept closed during the induction stroke, the vaporization taking place in one combustion chamber while exhaust residues are located in the other combustion chamber, that during the compression stroke only the second combustion chamber is open to the cylinder chamber and in the first combustion chamber the combustion is commenced, that after top dead center, the second combustion chamber is closed off from the cylinder chamber, while the first combustion chamber is open, that in the power stroke during at least the majority of the stroke the first combustion chamber remains open, while in the second combustion chamber the vaporization is commenced, and that shortly before or shortly after bottom dead center for commencement of the exhaust stroke the first combustion chamber is closed and during the exhaust stroke remains closed, while in the second combustion chamber the vaporization is continued during the exhaust stroke.

Starting from the internal combustion engine described hereinbefore, the above-mentioned aspect is achieved according to the invention by the fact that the combustion chamber is formed by two separate combustion chambers of preferably and substantially equal size, which each have an inlet and/or outlet opening, which can be connected to the cylinder chamber by appropriate control means in adaptation to the strokes of the associated piston alternately one after the other for receiving the compressed fresh gas or for expanding the combustion gases.

According to the invention the whole of the mixture preparation and the combustion process are separated in time and space from the previously known four-stroke or two-stroke process. In parallel with these known stroke processes runs, according to the invention, a fifth or third "combustion stroke". By this means sufficient time is gained for mixture preparation and the combustion process and hence better energy exploitation and a reduction in pollutant discharge are obtained. Optimization of the process is effected by an optimum choice of the position and moment for fuel injection and the ignition, by the use of any desired, if necessary slow-burning fuels and fuel mixtures (e.g. naphtha with water), by the combustion of combustion moderators or catalysts (e.g. water, nickel charge for mixture of naphtha with water, ceramic charges for flameless combustion, etc.), by optimization of the degree of compression, or by additional water injection in order to be able to lower the exhaust temperatures without considerable pressure loss.

In an appropriate embodiment the two combustion chambers can be arranged in a drivable body of revolution which is mounted rotatably in the cylinder head and which is preferably a rotary slide arranged with axis parallel to the crankshaft and sealingly encompassed by a stationary rotary slide housing which comprises a connecting opening to the cylinder chamber.

Further it is appropriate if the two combustion chambers are located on two parallel chords arranged in inverse symmetry to the axis of rotation of the circular rotary slide and each comprise mutually opposed inlet and/or outlet openings which on rotation of the rotary slide are temporarily brought into register with the connecting opening of the rotary slide housing.

A modified embodiment is according to the invention characterized in that the rotary slide comprises, axially offset from the two combustion chambers, two through-channels which in a given rotational position of the rotary slide connect an inlet and/or exhaust opening provided in the rotary slide housing opposite the cylinder chamber, to the inlet and/or exhaust pipe.

In this case it is advantageous if the two through-channels are located on two parallel chords arranged in inverse symmetry to the axis of rotation of the rotary slide, which are offset by ninety (90) circumferential degrees from the combustion chambers also located on chords.

In this modified embodiment conventional valves as well as the camshaft controlling them can be dispensed with, with the result that the manufacturing costs can be reduced. This embodiment is moreover less susceptible to breakdown and allows higher speeds of rotation. Here it is basically possible to build an internal combustion engine without a separate cylinder head. Instead, the cylinder head can be integrated in the engine body.

In a further modified embodiment, according to the invention it can be provided that the rotary slide is axially displaceable in order to connect the combustion chambers alternately to the cylinder chamber of an adjacent cylinder.

Further aspects of the invention are the subject of the subsidiary claims and are described in more detail in conjunction with further advantages of the invention with the aid of practical examples. The above-described aspects are merely illustrative and should not be deemed all-inclusive.

The method of operation according to the invention allows the construction of engines that are smaller, less complicated and therefore cheaper, with the same performance. Since according to the invention isochoric combustion is possible, the pressure drop that was normal hitherto is avoided during combustion in the power stroke; but at the same time pollutant emission is considerably reduced.

BRIEF DESCRIPTION OF THE DRAWINGS

Reference is not made more particularly to the drawings, which illustrate the best presently known mode of carrying out the invention and wherein similar reference characters indicate the same parts throughout the views.

FIG. 2 is a modified embodiment in an axial section turned through 90° from FIG. 1, with a rotary slide valve control system arranged axially adjacent to the combustion chambers;

FIG. 3 is a vertical section through the valve control system along line A in FIG. 2;

FIG. 4 is a vertical section through the combustion chambers along line B in FIG. 2;

DETAILED DESCRIPTION

Figure 1:
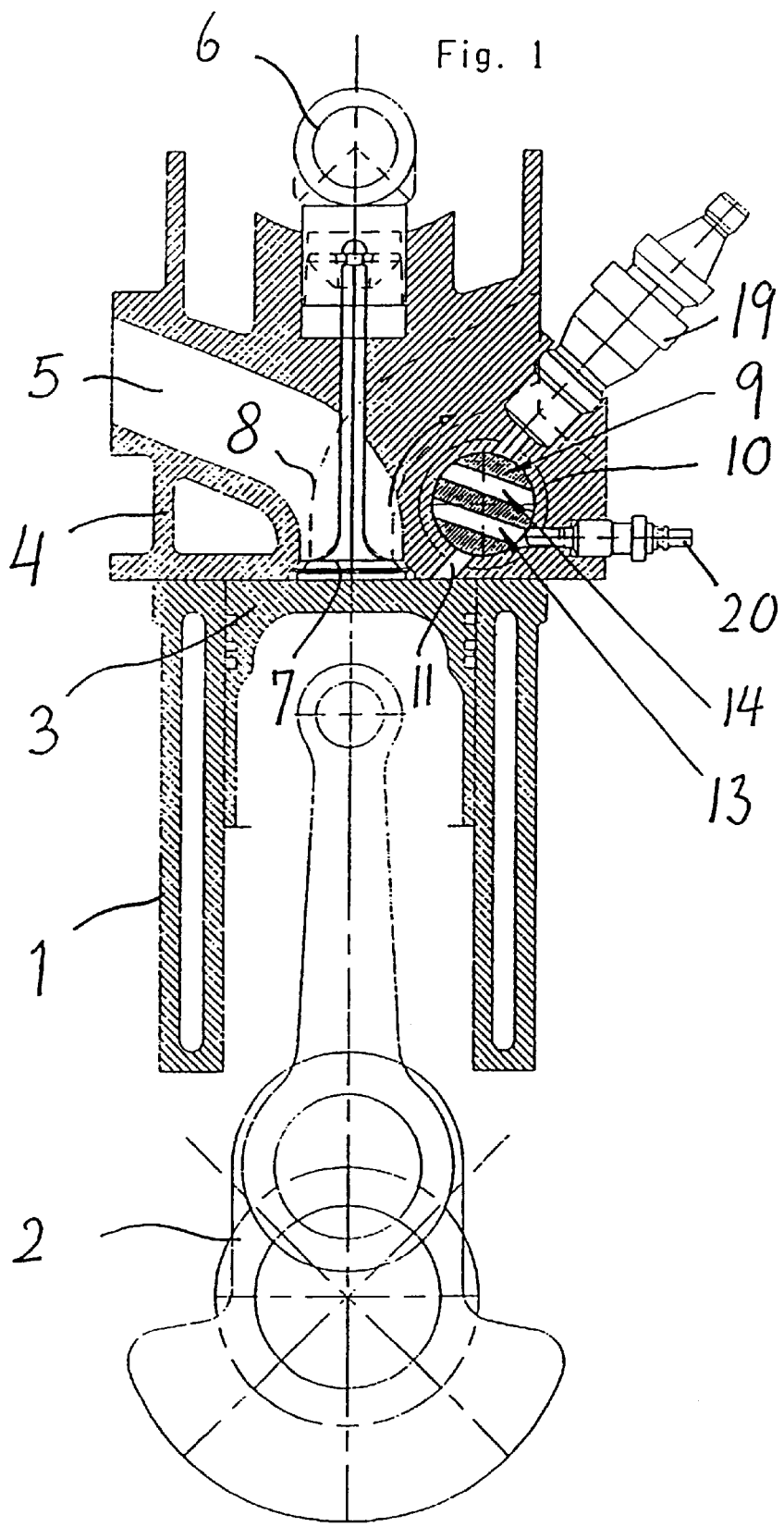
FIG. 1 is a vertical section through a cylinder and the associated cylinder head with a piston in its top dead center position.

FIG. 1 shows a cylinder 1 of a four-stroke engine with a piston 3 driven by a crankshaft 2 with a cylinder head 4 located on top. The cylinder head 4 includes an inlet pipe 5 with an inlet valve 7 controlled by a camshaft 6 and an exhaust pipe 8 shown in broken lines with an exhaust valve also controlled by the camshaft 6 but not shown in more detail in the drawings.

The cylinder head 4 is rotatably mounted with an axis parallel to the crankshaft 2, a rotary slide 9 which is preferably driven by the crankshaft 2 via a reduction gear in such a way that the rotary slide 9 rotates at one-quarter of the speed of the crankshaft 2. The rotary slide 9 is sealingly encompassed by a stationary rotary slide housing 10, which in the embodiment shown forms part of the cylinder head 4 and comprises a connecting opening 11 to the cylinder chamber 12 (see FIG. 1a).

The rotary slide 9 includes two separate combustion chambers 13, 14 of preferably and substantially equal size which in the embodiment shown are designed as rectilinear channels which are located on two parallel chords arranged in inverse symmetry to the axis of rotation 9a of the circular rotary slide 9 and each comprise mutually opposed inlet and/or outlet openings 15, 16 and/or 17, 18 which open out in the surface of the rotary slide 9 and which on rotation of the rotary slide 9 are temporarily brought into register with the connecting opening 11 of the rotary slide housing 10.

Figure 4A:
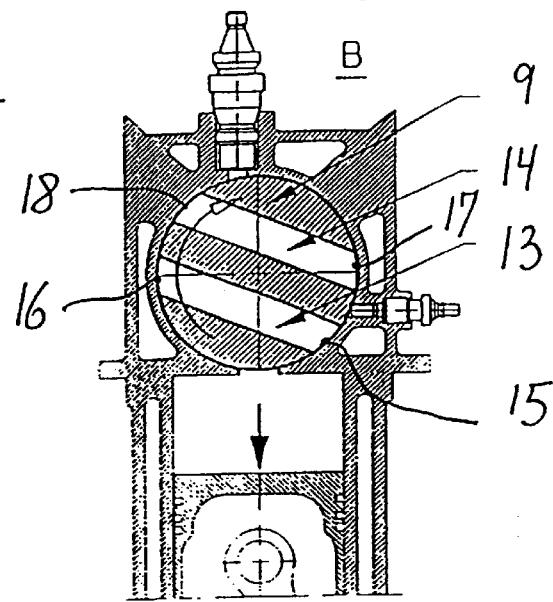
FIG. 4a is the view according to FIG. 4 in the induction stroke of the first cycle.
Figure 3B:
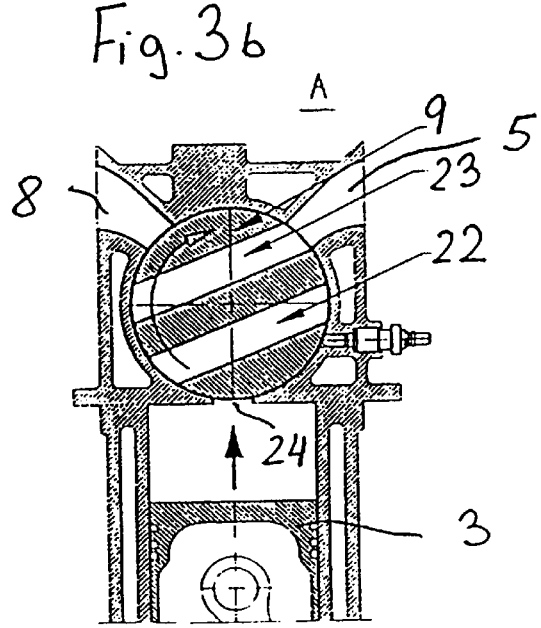
FIG. 3b is the view according to FIG. 3a in the compression stroke of the first cycle.
Figure 4B:
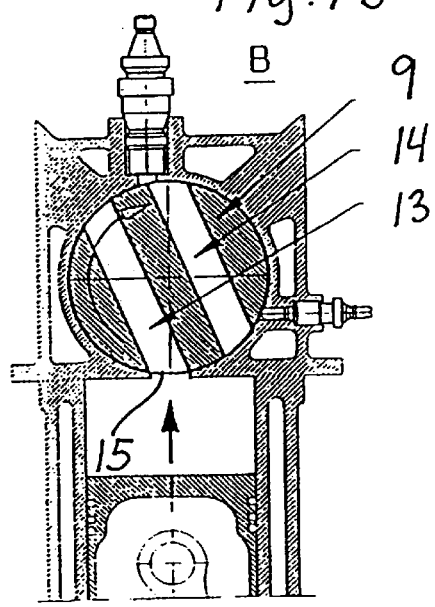
FIG. 4b is the view according to FIG. 4a in the compression stroke of the first cycle.
Figure 3C:
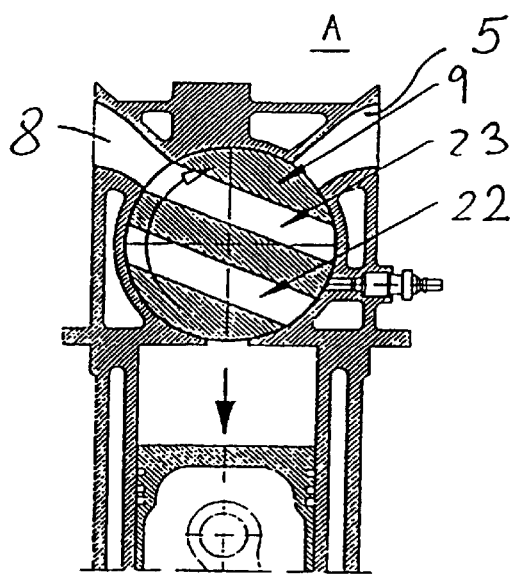
FIG. 3c is the view according to FIG. 3b in the power stroke of the first cycle.
Figure 4C:
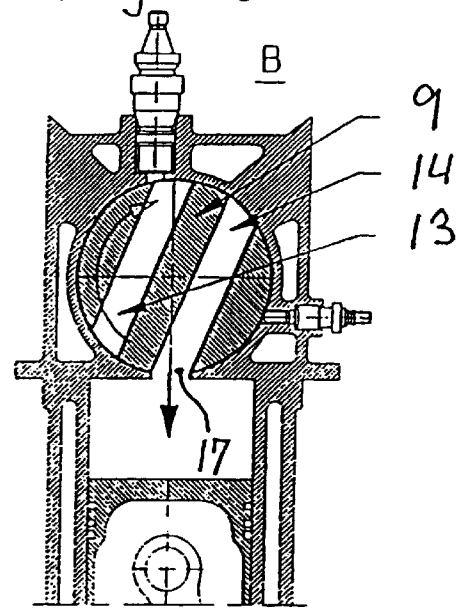
FIG. 4c is the view according to FIG. 4b in the power stroke of the first cycle.
Figure 3D:
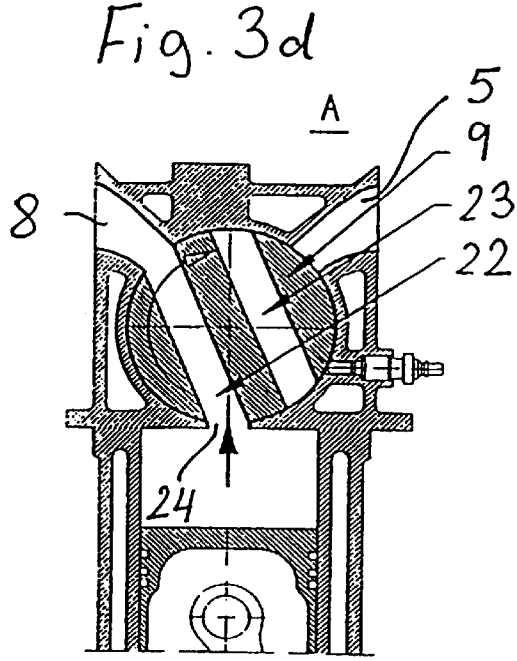
FIG. 3d is the view according to FIG. 3c in the exhaust stroke of the first cycle.
Figure 4D:
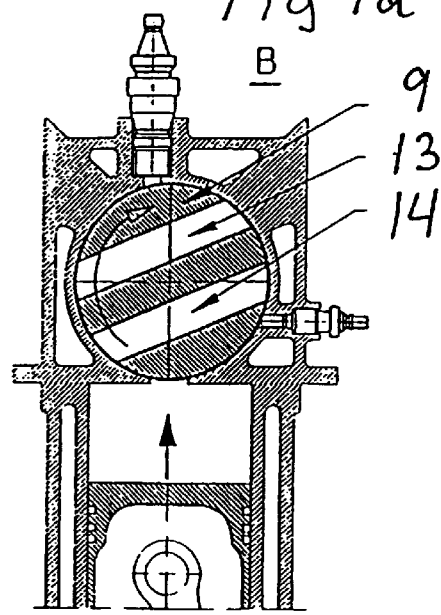
FIG. 4d is the view according to FIG. 4c in the exhaust stroke of the first cycle.

FIG. 1 further reveals that a fuel injection nozzle 19 arranged in the cylinder head 4 or in the rotary slide housing 10 as well as a spark plug 20 that extends into the peripheral path of the inlet and/or outlet openings 15, 16, 17, 18 (see FIG. 4a).

Figure 1A:
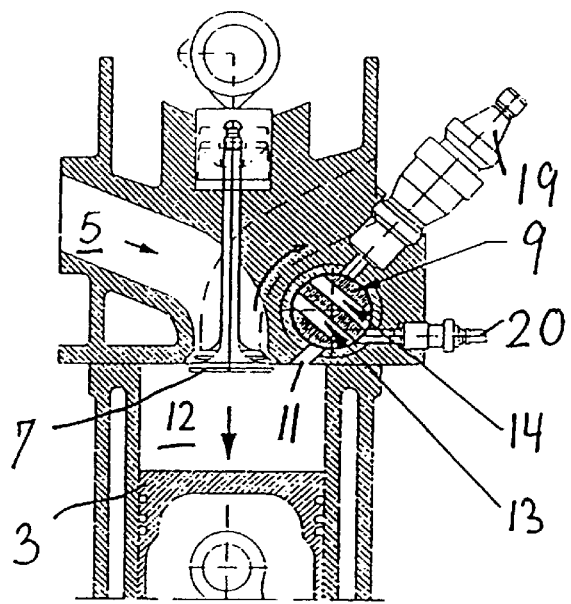
FIG. 1a is the view according to FIG. 1 in the induction stroke of the first cycle.

FIG. 1a shows the system in the induction stroke of the first cycle. The piston 3 is, as shown by the arrow drawn in, in its downward movement; the inlet valve 7 is open; fresh gas is drawn into the cylinder chamber 12. Both combustion chambers 13, 14 are closed, the combustion chamber 13 being filled with an exhaust residue, while in the combustion chamber 14 vaporization of the enclosed fuel takes place.

Figure 1B:
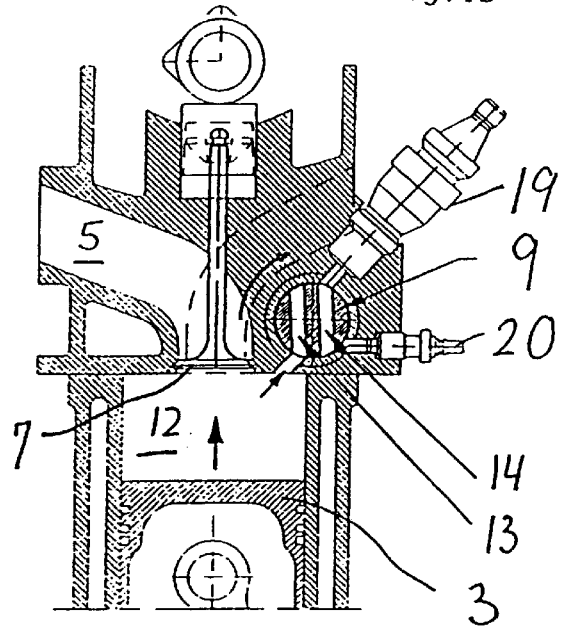
FIG. 1b is the view according to FIG. 1a in the compression stroke of the first cycle.

FIG. 1b shows the system in the compression stroke of the first cycle. The inlet valve 7 is closed; the piston 3 moves upwards and compresses the fresh gas previously drawn in, in the cylinder chamber 12; the combustion chamber 13 is connected by its inlet opening 15 to the connecting opening 11 and hence to the cylinder chamber 12, so that the piston 3 forces the compressed fresh gas into the combustion chamber 13. The injection nozzle 19 injects fuel via the inlet opening 18 into the combustion chamber 14 which with its other inlet opening 17 has just been moved past the spark plug 20, by the ignition of which combustion is commenced in the combustion chamber 14.

Figure 1C:
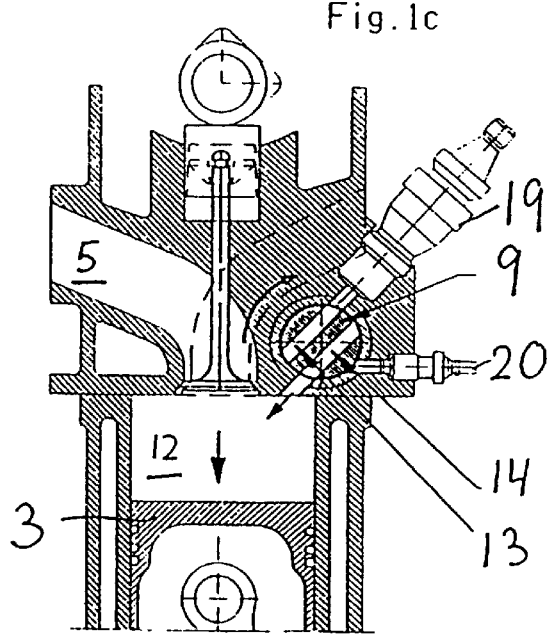
FIG. 1c is the view according to FIG. 1b in the power stroke of the first cycle.

FIG. 1c shows the system in the power stroke of the first cycle. By further rotation of the rotary slide 9, the combustion chamber 13 is now connected by its inlet opening 18 to the fuel injection nozzle 19 which injects the fuel into the combustion chamber 13 filled with the compressed fresh gas. The combustion chamber 14 is connected by its outlet opening 17 and the connecting opening 11 to the cylinder chamber 12, so that the combustion gases under high pressure in the combustion chamber 14 expand into the cylinder chamber 12 and here act on the piston 3.

Figure 1D:
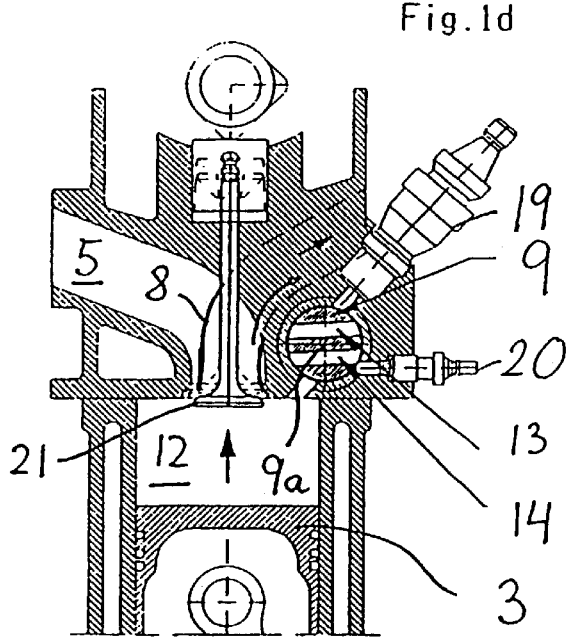
FIG. 1d is the view according to FIG. 1c in the exhaust stroke of the first cycle.
Figure 3A:
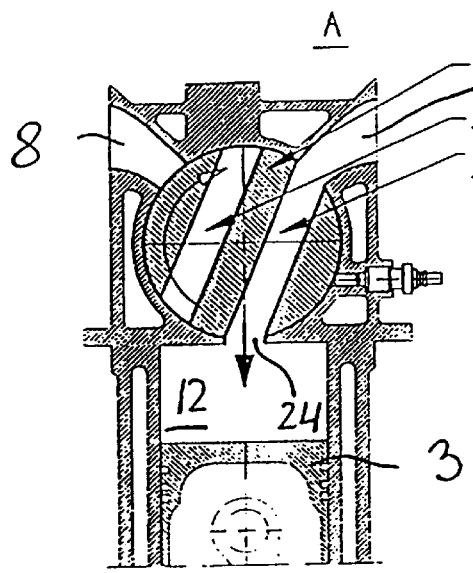
FIG. 3a is the view according to FIG. 3 in the induction stroke of the first cycle.

FIG. 1d shows the system in the exhaust stroke. The exhaust valve 21 is open; the piston 3 moves upwards and pushes the exhaust gas into the exhaust pipe 8. Both combustion chambers 13, 14 are closed; in the combustion chamber 13 vaporization of the fuel takes place, while the combustion chamber 14 contains only exhaust residues.

FIGS. 2 to 4 show a modified embodiment in which the rotary slide 9 comprises, axially offset from the two combustion chambers 13, 14, two through-channels 22, 23 which are also located on two parallel chords arranged in inverse symmetry to the axis of rotation 9a of the rotary slide 9, which are offset by 90 circumferential degrees from the chords of the combustion chambers 13, 14. The two through-channels 22, 23 in a given rotational position of the rotary slide 9 connect an inlet and/or exhaust opening 24 provided in the rotary slide housing 10 opposite the cylinder chamber 12, to the inlet pipe 5 and/or exhaust pipe 8.

FIGS. 3a to 3d show, analogously to FIGS. 1a to 1d, a respective position of the through-channels 22, 23 in the induction stroke, in the compression stroke, in the power stroke and in the exhaust stroke for one cycle. Associated with these FIGS. 3a to 3d are FIGS. 4a to 4d which for the respective stroke shown in FIGS. 3a to 3d show the position of the combustion chambers 13, 14, which essentially correspond to the positions shown in FIGS. 1a to 1d.7

What is claimed is:

1. A method of operation of an internal combustion engine, including a cylinder head, having a first combustion chamber and a second combustion chamber, located over a piston with a cylinder chamber formed between the piston and the cylinder head, wherein the piston is operatively connected to a crankshaft, comprising:

drawing fresh gas into a cylinder chamber;

compressing the fresh gas in the cylinder chamber with the piston forcing compressed fresh gas into the first combustion chamber that is fluidly connected to the cylinder chamber;

injecting fresh gas into the first combustion chamber;

combusting the compressed fresh gas in the first combustion chamber that is fluidly connected to the cylinder chamber with the pressure of the combustion gases generated thereby moving the piston;

expelling exhaust gases from the cylinder chamber after moving the piston;

compressing the fresh gas in the cylinder chamber with the piston forcing compressed fresh gas into the second combustion chamber that is fluidly connected to the cylinder chamber;

injecting fresh gas into the second combustion chamber;

combusting the compressed fresh gas in the second combustion chamber that is fluidly connected to the cylinder chamber with pressure of the combustion gases generated thereby moving the piston;

expelling exhaust gases from the cylinder chamber after moving the piston; and moving the first and the second combustion chambers in a synchronous movement one after another past an overflow connection connecting the first or the second combustion chamber to the cylinder chamber.

2. The method according to claim 1, wherein during an induction stroke, the drawing fresh gas into a cylinder chamber when the first combustion chamber and the second combustion chamber are not fluidly connected to the cylinder chamber and wherein the compressing the fresh gas in the cylinder chamber with the piston forcing compressed fresh gas into the first combustion chamber that is fluidly connected to the cylinder chamber while the second combustion chamber is not fluidly connected to the cylinder chamber and while injecting fresh gas into the second combustion chamber that is not fluidly connected to the cylinder chamber and wherein the combusting the compressed fresh gas in the second combustion chamber that is fluidly connected to the cylinder chamber with pressure of the combustion gases generated thereby moving the piston and while injecting fresh gas into the first combustion chamber that is not fluidly connected to the cylinder chamber and wherein the expelling exhaust gases from the cylinder chamber after moving the piston wherein in the first combustion chamber vaporization takes place and in the second combustion chamber, where exhaust residues are present, wherein the first combustion chamber and the second combustion chamber are not fluidly connected to the cylinder chamber.

3. The method according to claim 1, wherein the fuel is alternately introduced into one of the first combustion chamber or the second combustion chamber.

4. The method according to claim 1, wherein either the first combustion chamber or the second combustion chamber can be connected alternately to the cylinder chamber of adjacent cylinders in the internal combustion engine.

5. The method according to claim 1, wherein the synchronous movement takes place at a continuous speed.

6. The method according to claim 5, wherein the synchronous movement is rotational.

7. The method according to claim 6, wherein the rotational synchronous movement of the first and the second combustion chambers rotate at a speed of rotation which is equal to or less than one-quarter of rotational speed of the crankshaft driving the piston.

8. The method according to claim 6, further comprising an inlet connection connecting the cylinder chamber temporarily to an inlet pipe as well as an exhaust connection connecting the cylinder chamber temporarily to an exhaust pipe that rotates synchronously with the first and second combustion chambers, wherein the first and second combustion chambers are kept closed off from the cylinder chamber during the respective inlet connection or the exhaust connection.

9. An internal combustion engine comprising:
at least one piston that is driven by a crankshaft and which is guided in a cylinder whose cylinder chamber located above the at least one piston, which can be alternately connected by a valve control system to an inlet pipe for fresh gas and to an exhaust pipe for exhaust gases and is connected to a combustion chamber in which vaporization of fuel contained in or introduced into the compressed fresh gas and then combustion thereof effected, wherein the combustion chamber is formed by first and second combustion chambers, each having an inlet and/or outlet opening, which can be connected to the cylinder chamber by appropriate control means in adaptation to strokes of the associated piston alternately one after another for receiving the compressed fresh gas or for expanding the combustion gases, and the first and second combustion chambers are arranged in a driveable body of revolution which is mounted rotatably in the cylinder chamber.

10. The internal combustion engine according to claim 9, wherein the driveable body of revolution is a rotary slide arranged with an axis parallel to the crankshaft and sealingly encompassed by a stationary rotary slide housing, which includes a connecting opening to the cylinder chamber.

11. The internal combustion engine according to claim 10, wherein the first and second combustion chambers are located on two parallel chords arranged in inverse symmetry to an axis of rotation of the circular rotary slide and each comprise mutually opposed inlet or outlet openings, which on rotation of the rotary slide are temporarily brought into register with the connecting opening of the rotary slide housing.

12. The internal combustion engine according to claim 11, further including a fuel injection nozzle arranged in the rotary slide housing that extends into a peripheral path of the inlet or outlet openings.

13. The internal combustion engine according to claim 11, further including a spark plug that extends into a peripheral path of the inlet or outlet openings.

14. The internal combustion engine according to claim 11, wherein driving of the rotary slide by the crankshaft is effected with a transmission ratio of at least 4:1.

15. The internal combustion engine according to claim 11, wherein the rotary slide is axially displaceable in order to connect the first and second combustion chambers alternately to the cylinder chamber of an adjacent cylinder.

16. The internal combustion engine according to claim 11, wherein the rotary slide includes, axially offset from the two combustion chambers, two through-channels which in a given rotational position of the rotary slide connect an inlet or exhaust opening provided in the rotary slide housing opposite the cylinder chamber, to the inlet or the exhaust pipe.

17. The internal combustion engine according to claim 16, wherein the two through-channels are located on two parallel chords arranged in inverse symmetry to an axis of rotation of the rotary slide, which are offset from the combustion chambers and are also located on the two parallel chords.

* * * * *

UNITED STATES PATENT AND TRADEMARK OFFICE
CERTIFICATE OF CORRECTION

PATENT NO.       : 6,318,335 B2
DATED            : November 20, 2001
INVENTOR(S)      : Hubert Tomczyk It is certified that error appears in the above-identified patent and that said Letters Patent is hereby corrected as shown below:

<u>Title page,</u>
Under [73] Assignee delete "diro GmbH & Co. KG" and insert -- DIRO Konstruktions GmbH & Co. KG --

Following "[22] Filed: Mar. 22, 2001" insert:
-- [65]   Prior Publication Data
  WO 00/17502          Mar. 30, 2000 --

Following "[63] Continuation of application No. PCT/DE99/02945, filed on Sep. 16, 1999." insert:
-- [30]   Foreign Application Priority Data
September 23, 1998    (DE).................. 198 43 567.3 --

Signed and Sealed this

First Day of April, 2003

JAMES E. ROGAN
*Director of the United States Patent and Trademark Office*